(No Model.)
E. BAINES.
SYSTEM FOR TRANSMITTING ELECTRIC CURRENTS.
No. 493,673. Patented Mar. 21, 1893.
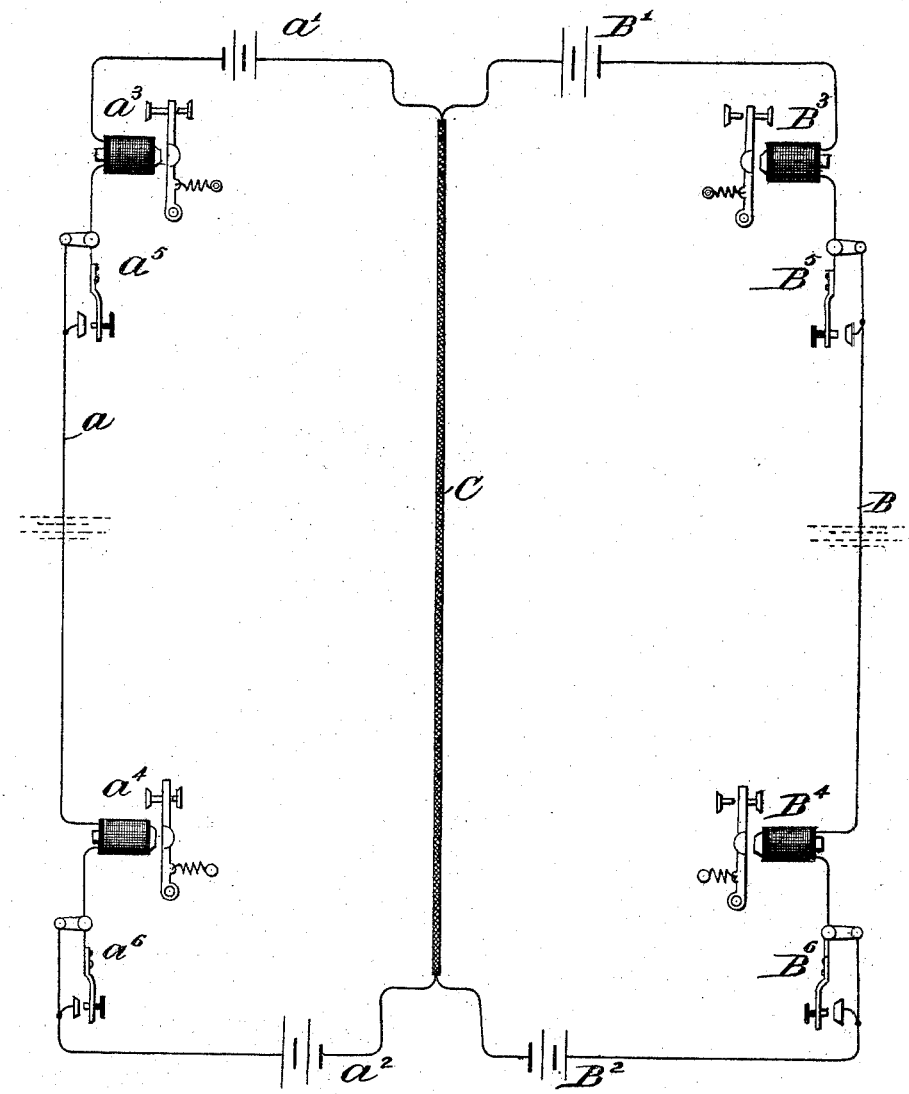
Witnesses:
John Baines,
John H. Nienstadt.
Inventor:
Edward Baines

UNITED STATES PATENT OFFICE.

EDWARD BAINES, OF BROOKLYN, NEW YORK, ASSIGNOR TO HIMSELF AND EDWARD J. MITCHELL, OF SAME PLACE, AND ADOLPH L. MITCHELL, OF ROCKVILLE, NEW YORK.

SYSTEM FOR TRANSMITTING ELECTRIC CURRENTS.

SPECIFICATION forming part of Letters Patent No. 493,673, dated March 21, 1893.

Application filed March 21, 1892. Serial No. 425,865. (No model.)

*To all whom it may concern:*

Be it known that I, EDWARD BAINES, a subject of the Queen of Great Britain, residing at the city of Brooklyn, in the county of Kings, in the State of New York, have invented certain new and useful Improvements in Systems for Transmitting Electric Currents; and I do hereby declare that the following is a full, clear, and exact description of the same.

This invention relates to improvements in systems for transmitting electric currents and it consists in the novel arrangement of the parts hereinafter described.

In the drawing the figure is a plan view illustrating the position of the parts in this system.

In the drawing I have shown two circuits connected by having a common member through part of their circuits. These circuits may be added to indefinitely and still retain the common member and it is to be understood that I describe only two circuits for convenience merely.

In this specification I describe and show my invention as it is to be used for telegraphic purposes and it is to be understood that my invention is applicable to all systems which are to be used for the transmission of electric currents.

In the drawing letters A and B designate non-insulated and separate members of the system and C the insulated member common to both A and B. The common member C acts as a common metallic return to all of the systems and may consist of a single wire or of many wires twisted together to form a cable.

Each of the separate members A and B is provided at either end with batteries A′ and A² and B′ and B² which are located between the relays, telephones or other instruments A³ and A⁴ and B³ and B⁴, and the common member C. The batteries may be arranged in any desired manner, that is currents of a like name may be sent through A and B in the same direction or a current may be sent in one direction through one of the circuits while a current is passing in an opposite direction through the other circuit.

To lay out this system for manipulation upon it the insulated common metallic return C is connected at either end to the electrodes emanating from the batteries at the ends of the line wires A and B and is suspended between the batteries on insulated poles or placed in contact with the earth in which case it is insulated from end to end. The line wires A and B are upon issuing from the office placed in contact with the earth and are not provided with any insulation, they are placed with no particular care as to the distance one from the other, the only care exercised being to prevent actual contact.

When desired this system may be placed upon poles the return C being insulated and the line wires A and B being not insulated but merely kept a suitable distance apart.

In the operation of this system when the keys $A^5$ and $A^6$ are manipulated the relays $A^3$ and $A^4$ are operated without in any way affecting the relays $B^3$ and $B^4$ likewise when the keys $B^5$ or $B^6$ are manipulated the relays $B^3$ and $B^4$ are operated without in any way affecting the relays on the other circuit A.

The currents in this system remain separate though connected by a common return as they will not pass through the intervening matter between the lines owing to the greater resistance offered than by the wire.

The advantages of this system are apparent as by it the necessity of insulating the line wires is overcome also the accidents, by breakage incident to the weather such as pressure of the wind or weight of ice are overcome.

When I use my system for multiple transmission on one wire I remove the generators or batteries from the positions shown in full lines to the positions shown by dotted lines the common member becoming the multiple transmission wire.

What I claim as my invention, and what I desire to secure by Letters Patent, is—

1. In a system for transmitting electric currents the combination of two or more non-insulated line wires in contact with the earth, each supplied with an electric generator, transmitting and receiving instruments on each line; and an insulated metallic return connected to all of the line wires, substantially as specified and described.

2. In a system for transmitting electric currents the combination of two or more line wires each provided with an electric generator, transmitting and receiving instruments on each line; the line wires being in contact with the earth for a section or sections of their length and the remaining section or sections being insulated; and an insulated common return connected to the generators on all of the line wires substantially as specified and described.

3. In a system for transmitting electric currents the combination of two or more non insulated or partly insulated line wires, an insulated common return, receiving and transmitting instruments, and electric generators all arranged and combined in the manner shown and described.

EDWARD BAINES. [L. S.]

Witnesses:
JOHN HENRY NIEUSTADT,
WM. H. FRIDAY, Jr.